US012689854B2

(12) United States Patent
Ren et al.

(10) Patent No.: US 12,689,854 B2
(45) Date of Patent: Jul. 21, 2026

(54) OPERATION CONTROL METHOD OF HEADSET, RING HEADSET AND STORAGE MEDIUM

(71) Applicant: GOERTEK INC., Weifang (CN)

(72) Inventors: Jianlei Ren, Weifang (CN); Jian Feng, Weifang (CN); Junjie Pan, Weifang (CN)

(73) Assignee: GOERTEK INC., Weifang (CN)

( * ) Notice: Subject to any disclaimer, the term of this patent is extended or adjusted under 35 U.S.C. 154(b) by 131 days.

(21) Appl. No.: 18/757,838

(22) Filed: Jun. 28, 2024

(65) Prior Publication Data

US 2024/0357278 A1 Oct. 24, 2024

Related U.S. Application Data

(63) Continuation of application No. PCT/CN2022/084613, filed on Mar. 31, 2022.

(30) Foreign Application Priority Data

Feb. 28, 2022 (CN) ........................ 202210192992.7

(51) Int. Cl.
*H04R 1/10* (2026.01)
*H04R 3/00* (2006.01)

(52) U.S. Cl.
CPC ............ *H04R 1/1091* (2013.01); *H04R 3/00* (2013.01); *H04R 2201/023* (2013.01)

(58) Field of Classification Search
CPC ... H04R 1/1091; H04R 3/00; H04R 2201/023
See application file for complete search history.

(56) References Cited

U.S. PATENT DOCUMENTS

| | | | | |
|---|---|---|---|---|
| 11,950,039 | B2 * | 4/2024 | LeBoeuf | A61B 5/1126 |
| 2010/0056233 | A1 | 3/2010 | Thiel et al. | |
| 2012/0230508 | A1 * | 9/2012 | Chuang | H04M 1/725 381/74 |

(Continued)

FOREIGN PATENT DOCUMENTS

| | | |
|---|---|---|
| CN | 103546181 A | 1/2014 |
| CN | 104720216 A | 6/2015 |

(Continued)

OTHER PUBLICATIONS

English Language Translation of CN206324363U, pp. 1-6. (Year: 2017).*

(Continued)

*Primary Examiner* — Paul W Huber
(74) *Attorney, Agent, or Firm* — HAUPTMAN HAM, LLP

(57) ABSTRACT

Disclosed are an operation control method of a headset, an operation control device of a headset, a ring headset, and a computer-readable storage medium. The method is applied to applied to a ring headset, and includes: in response to detecting that a user is wearing the ring headset, determining a wearing position where the user wears the ring headset; in response to determining that the wearing position is a user's finger, controlling the ring headset to operate a first working mode; or in response to determining that the wearing position is a user's ear, controlling the ring headset to operate a second working mode.

11 Claims, 9 Drawing Sheets

(56) References Cited

U.S. PATENT DOCUMENTS

| | | | | |
|---|---|---|---|---|
| 2019/0384354 | A1* | 12/2019 | von Badinski | G06F 1/163 |
| 2021/0058692 | A1 | 2/2021 | Shankar | |
| 2021/0097285 | A1* | 4/2021 | Lee | G06F 3/011 |
| 2022/0394370 | A1* | 12/2022 | Sarbou | A61B 5/02438 |
| 2024/0040298 | A1* | 2/2024 | Zou | H04R 1/1058 |

FOREIGN PATENT DOCUMENTS

| | | | | | |
|---|---|---|---|---|---|
| CN | 204442630 | U | * | 7/2015 | |
| CN | 205265889 | U | * | 5/2016 | |
| CN | 106303776 | A | | 1/2017 | |
| CN | 206324363 | U | | 7/2017 | |
| CN | 206422887 | U | | 8/2017 | |
| CN | 210807624 | U | | 6/2020 | |
| CN | 111836167 | A | | 10/2020 | |
| CN | 112055296 | A | * | 12/2020 | H04R 1/1016 |
| CN | 112543247 | A | | 3/2021 | |
| CN | 113301465 | A | | 8/2021 | |

OTHER PUBLICATIONS

English Language Translation of CN205265889U, pp. 1-6. (Year: 2016).*

English Language Translation of CN204442630U, pp. 1-4. (Year: 2015).*

English Language Translation of CN112055296, pp. 1-13. (Year: 2020).*

First Office Action in Corresponding Chinese Application No. 202210192992.7, dated Aug. 17, 2022; 20 pgs.

International Search Report and Written Opinion in Corresponding International Application No. PCT/CN2022/084613, mailed Aug. 31, 2022; 12 pgs.

Refusal Decision in Corresponding Chinese Application No. 202210192992.7, dated May 18, 2023; 21 pgs.

Second Office Action in Corresponding Chinese Application No. 202210192992.7, dated Jan. 11, 2023; 19 pgs.

* cited by examiner

OPERATION CONTROL METHOD OF HEADSET, RING HEADSET AND STORAGE MEDIUM

CROSS-REFERENCE TO RELATED APPLICATIONS

This application is a continuation application of International Application No. PCT/CN2022/084613, filed on Mar. 31, 2022, which claims priority to Chinese Patent Application No. 202210192992.7, filed on Feb. 28, 2022. The disclosures of the above-mentioned applications are incorporated herein by reference in their entireties.

TECHNICAL FIELD

The present application relates to the technical field of headsets, and in particular to an operation control method of a headset, an operation control device of a headset, a ring headset, and a computer-readable storage medium.

BACKGROUND

With the development of the smart electronics industry, current headset products have developed to the True Wireless Stereo (TWS) headset stage. TWS headset products have been recognized and affirmed by market users based on their easy-to-wear, compact and powerful features. Based on this market background, manufacturers in the industry have paid more and more attention to the design and development of new forms of TWS headsets that meet users' higher performance requirements.

However, most of the existing TWS headset products are stored in exclusive headset boxes for users to carry, and TWS headset products also require the exclusive headset box to charge, and their working mode is very single.

In summary, the existing TWS headsets have a very single working mode and cannot meet users' higher performance requirements for TWS headsets.

SUMMARY

The main objective of the present application is to provide an operation control method of a headset, an operation control device of a headset, a ring headset, and a computer-readable storage medium, which aims to provide an operation control method applied to a ring headset, so that the new form of TWS headsets can meet the higher performance requirements of different types of users for TWS headsets.

In order to achieve the above objective, the present application provides an operation control method of a headset, applied to a ring headset, including:

- in response to detecting that a user is wearing the ring headset, determining a wearing position where the user wears the ring headset;
- in response to determining that the wearing position is a user's finger, controlling the ring headset to operate a first working mode; or
- in response to determining that the wearing position is a user's ear, controlling the ring headset to operate a second working mode.

In an embodiment, the ring headset includes a pressure detector, and the determining the wearing position where the user wears the ring headset includes:

- receiving an indication signal transmitted by the pressure detector, where the indication signal includes a first signal transmitted by the pressure detector when it detects that a pressure value is less than or equal to a preset pressure threshold and a second signal transmitted by the pressure detector when it detects that the pressure value is greater than the preset pressure threshold;
- in response to that the received indication signal is the first signal, determining that the wearing position is the user's ear; or
- in response to that the received indication signal is the second signal, determining that the wearing position is the user's finger.

In an embodiment, the ring headset includes a touch detector, and the determining the wearing position where the user wears the ring headset includes:

- receiving a third signal or a fourth signal transmitted by the touch detector, where the touch detector is configured to transmit the third signal when detecting that a contact area between the ring headset and a human body is less than or equal to a preset area threshold, or transmit the fourth signal when detecting that the contact area is greater than the preset area threshold; and
- determining the wearing position where the user wears the ring headset to be the user's ear according to the third signal, or determining the wearing position to be the user's finger according to the fourth signal.

In an embodiment, the ring headset includes a deformation detector, and the determining the wearing position where the user wears the ring headset includes:

- receiving a fifth signal or a sixth signal transmitted by the deformation detector, where the deformation detector is configured to transmit the fifth signal when detecting that a deformation amount of the ring headset is less than or equal to a preset deformation amount threshold when the user wears the ring headset, or transmit the sixth signal when detecting that the deformation amount is greater than the preset deformation amount threshold; and
- determining the wearing position where the user wears the ring headset to be the user's ear according to the fifth signal, or determining the wearing position to be the user's finger according to the sixth signal.

In an embodiment, the ring headset includes a temperature detector, and the determining the wearing position where the user wears the ring headset includes:

- receiving a seventh signal or an eighth signal transmitted by the temperature detector, where the temperature detector is configured to transmit the seventh signal when detecting that a temperature value is less than or equal to a preset temperature threshold, or transmit the eighth signal when detecting that the temperature value is greater than the temperature threshold; and
- determining the wearing position where the user wears the ring headset to be the user's finger according to the seventh signal, or determining the wearing position to be the user's car according to the eighth signal.

In an embodiment, the ring headset further includes a communicator, and the controlling the ring headset to operate the first working mode includes:

- establishing a communication connection with a preset mobile terminal through the communicator, and monitoring whether the mobile terminal transmits an audio output instruction according to the communication connection to control the ring headset to operate the first working mode.

In an embodiment, after monitoring whether the mobile terminal transmits the audio output instruction according to the communication connection, the method further includes:

in response to monitoring that the mobile terminal transmits the audio output instruction, receiving the audio output instruction according to the communication connection; and controlling the ring headset to switch from operating the first working mode to operating the second working mode according to the audio output instruction.

In an embodiment, the audio output instruction includes a call audio output instruction and a multimedia audio output instruction, and the second working mode includes a call working mode and an audio playback working mode;

the controlling the ring headset to switch from operating the first working mode to operating the second working mode according to the audio output instruction includes:

accessing a real-time call audio transmitted by the mobile terminal through the communication connection according to the call audio output instruction, controlling an audio player of the ring headset to output the real-time call audio, controlling a sound collector of the ring headset to collect real-time voice data and transmit the real-time voice data to the mobile terminal through the communication connection, to control the ring headset to switch from operating the first working mode to operating the call working mode; or accessing a multimedia audio transmitted by the mobile terminal through the communication connection according to the multimedia audio output instruction, and controlling the audio player to output the multimedia audio to control the ring headset to switch from operating the first working mode to operating the audio playback working mode.

In an embodiment, after establishing the communication connection with the preset mobile terminal through the communicator, the method further includes:

monitoring whether the mobile terminal receives a preset message prompt according to the communication connection; and in response to that the mobile terminal receives the preset message prompt according to the communication connection, controlling the ring headset to operate a message prompt working mode corresponding to the message prompt.

In an embodiment, the ring headset further includes a vibrator and a display, and the controlling the ring headset to operate the message prompt working mode corresponding to the message prompt includes:

vibrating through the vibrator and/or outputting display information corresponding to the message prompt through the display to control the ring headset to operate the message prompt working mode, where the display information includes lighting information and text information corresponding to the message prompt.

In order to achieve the above objective, the present application further provides an operation control device, applied to a ring headset, including:

a determination module, configured for determining a wearing position where the user wears the ring headset in response to detecting that a user is wearing the ring headset;

a first control module, configured for controlling the ring headset to operate a first working mode in response to determining that the wearing position is a user's finger; and a second control module, configured for controlling the ring headset to operate a second working mode in response to determining that the wearing position is a user's ear.

Each functional module of the operation control device of the headset of the present application implements the steps of the operation control method of the headset as described above during operation.

In order to achieve the above objective, the present application further provides a ring headset, including a memory, a processor, and an operation control program of a headset stored in the memory and executable on the processor, when the control program of the headset is executed by the processor, the steps of the operation control method of the headset as described above are implemented.

In order to achieve the above objective, the present application further provides a computer-readable storage medium, an operation control program of a headset is stored in the computer-readable storage medium, and when the control program of the headset is executed by a processor, the steps of the operation control method of the headset as described above are implemented.

In the present application, when the ring headset, a new form of TWS headset, detects that the user has worn the ring headset, it first determines whether the wearing position of the ring headset is the user's finger or the user's ear. Therefore, when the ring headset determines that the wearing position is the user's finger, the ring headset is controlled to operate the first working mode corresponding to the user's finger at this time. Alternatively, when the ring headset determines that the wearing position is the user's ear, the ring headset is controlled to operate the second working mode corresponding to the user's ear.

Compared with traditional TWS headsets, when the user does not carry the headset box or loses the corresponding headset box, the TWS headsets are not carried or even lost, the present application enables the user to directly wear the ring headset on the finger or on the ear, and the ring headset controls the headset to operate in different working modes based on the user wearing the ring headset on the finger or on the ear.

As such, the present application not only avoids the dependence of the TWS headsets on the headset box when carrying it, but also improves the convenience of the user to carry the headsets and makes it less likely to cause the headsets to be lost, can also automatically control the corresponding working mode of the ring headset according to the position where the user wears the ring headset, which greatly improves the intelligence of controlling the operation of the headset. Therefore, the present application enables a new form of TWS headset—the ring headset to meet the higher performance needs of different types of users for TWS headset, and improves the user's experience of using the headset.

The realization of the purpose, functional features and advantages of the present application will be further described with reference to the embodiments and the accompanying drawings.

DETAILED DESCRIPTION OF THE EMBODIMENTS

It should be understood that the specific embodiments described herein are only used to explain the present application and are not intended to limit the present application.

Figure 1:
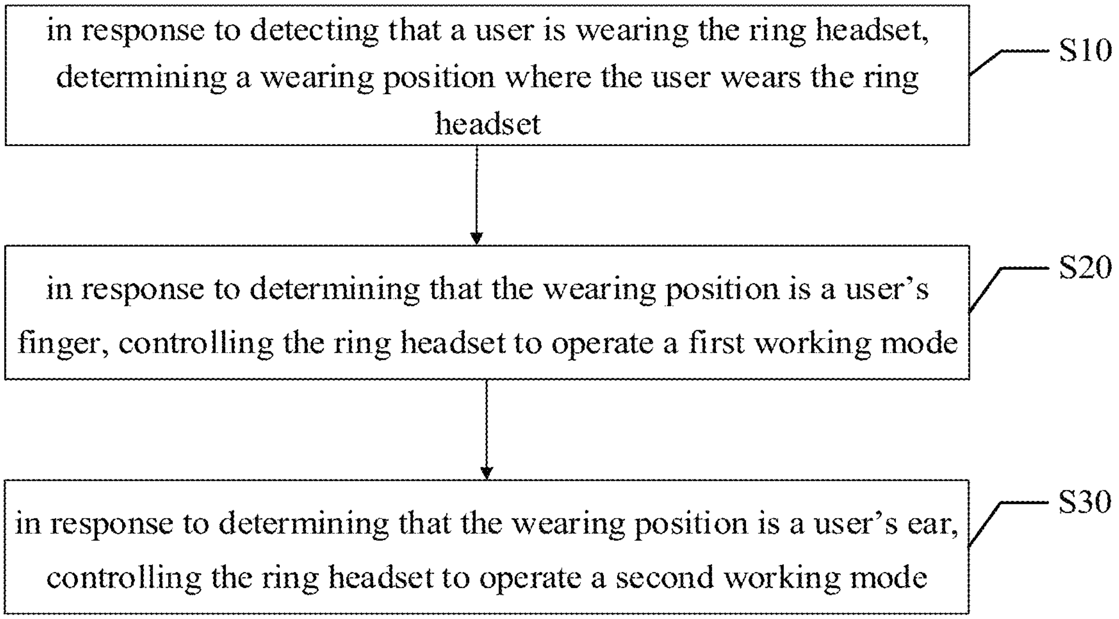
FIG. 1 is a schematic flowchart of an operation control method of a headset according to an embodiment of the present application.

As shown in FIG. 1, FIG. 1 is a schematic flowchart of an operation control method of a headset according to an embodiment of the present application.

Embodiments of the present application provide an operation control method of a headset. It should be noted that although a logical sequence is shown in the flowcharts, in some cases the steps shown or described may be performed in a sequence different from that herein.

Figure 2:
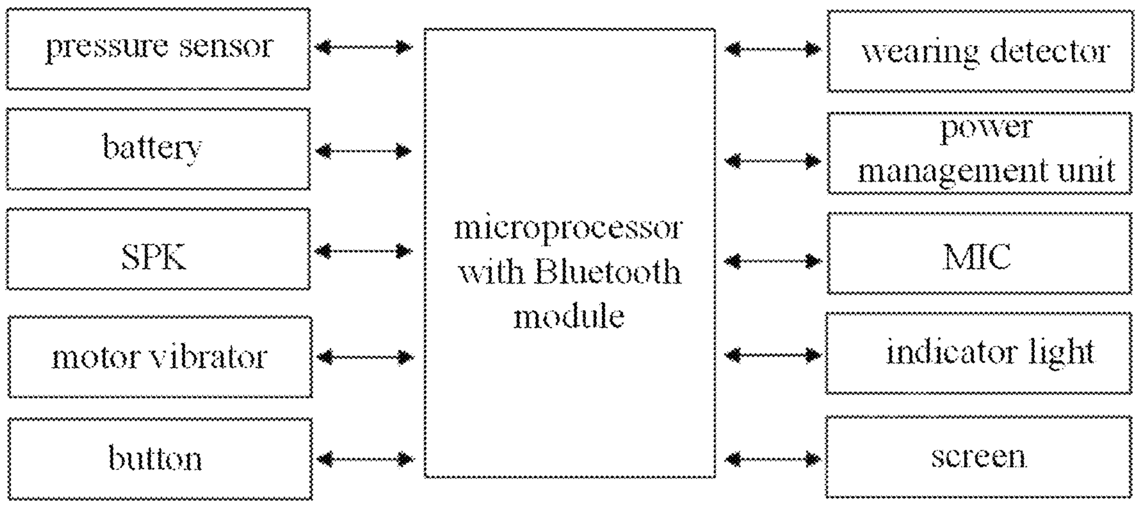
FIG. 2 is a schematic diagram of functional modules of a ring headset according to an embodiment of the present application.

The operation control method of the headset in the embodiments of the present application is applied to a ring headset. As shown in FIG. 2, the functional modules in the ring headset involved in the operation control method of the headset of the present application may include: a microprocessor with a Bluetooth module, a pressure sensor, a wearing detector, a battery, a power management unit, an audio player SPK, a microphone MIC, a motor vibrator, an indicator light, a button and a screen which are all independently electrically connected to the microprocessor. It should be understood that based on different design needs of practical applications, the functional modules included in the ring headsets can be different in different feasible implementations. The operation control method of the headset of the present application is not limited to the types of functional modules included in the ring headset.

Figure 3:
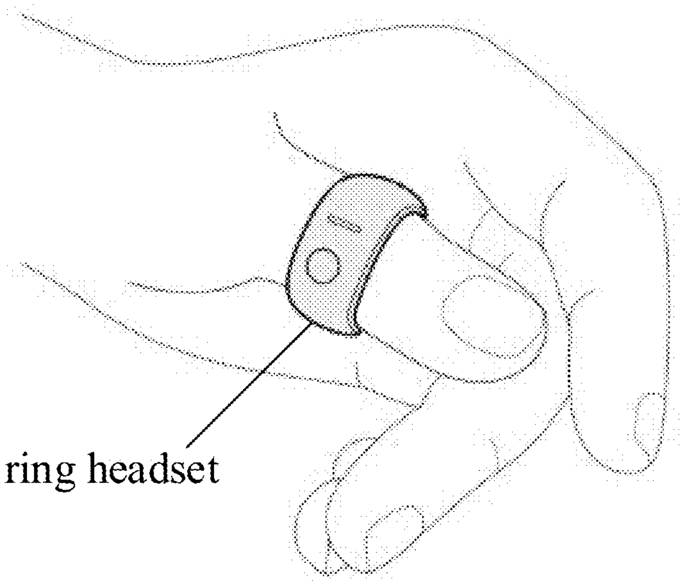
FIG. 3 is a schematic diagram of a scene when a user wears a ring headset on a finger according to an embodiment of the present application.
Figure 4:
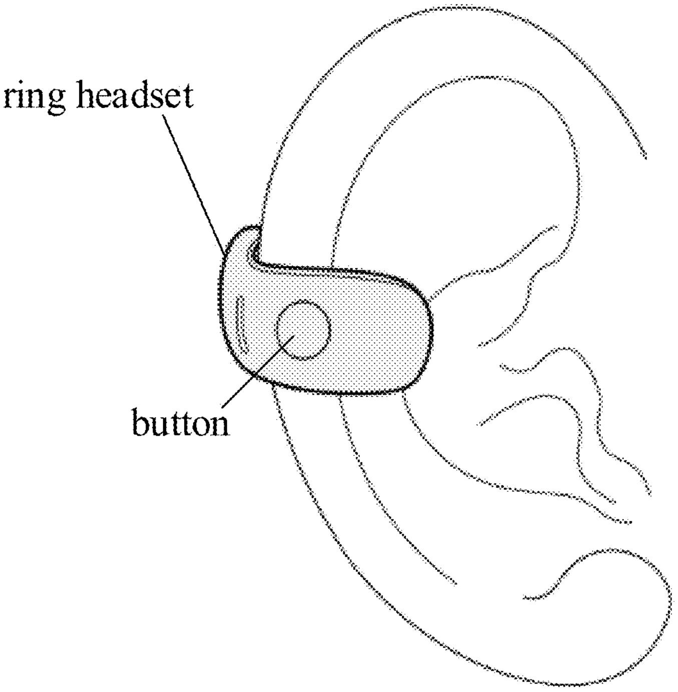
FIG. 4 is a schematic diagram of a scene when a user wears a ring headset on an ear according to an embodiment of the present application.

Besides, it should be noted that the above ring headset is a TWS headset. The ring headset is designed as a ring structure with an opening. As shown in FIG. 3, based on the ring structure, the user can directly wear the ring headset on the finger for carrying. Or, as shown in FIG. 4, the user removes the headset from the finger and clamps it on the auricle, and then presses the buttons on the headset to play/pause audio data and answer/hang up the phone. Besides, when the user plays audio data or answers a call, the ring headset can output corresponding audio data through a near-field external speaker device close to the user's ear hole. Alternatively, the ring headset can also output corresponding audio data through bone conduction through a sound wave output device arranged at a position where the headset contacts the user's auricle. It should be understood that based on different design needs of practical applications, the shape and structure of the ring headset can also have different designs in different feasible implementations. The operation control method of the headset in the present application does not specifically limit the shape and structure of the ring headset, as long as the ring headset can be worn on the user's fingers and ears based on its structural design.

In an embodiment of the present application, the operation control method of the headset includes:

Step S10, in response to detecting that a user is wearing the ring headset, determining a wearing position where the user wears the ring headset.

An internally configured wearing detector is adopted to detect whether the user is wearing the ring headset. Then, when it is detected that the user is wearing the ring headset, the current wearing position where the user wears the ring headset is further determined through the internal pressure detector.

It should be noted that, in this embodiment, the wearing detector configured inside the ring headset can be an infrared sensor. The ring headset determines that the user is currently wearing the ring headset by transmitting an electrical signal to the microprocessor when the infrared sensor detects that the infrared light is blocked.

Figure 5:
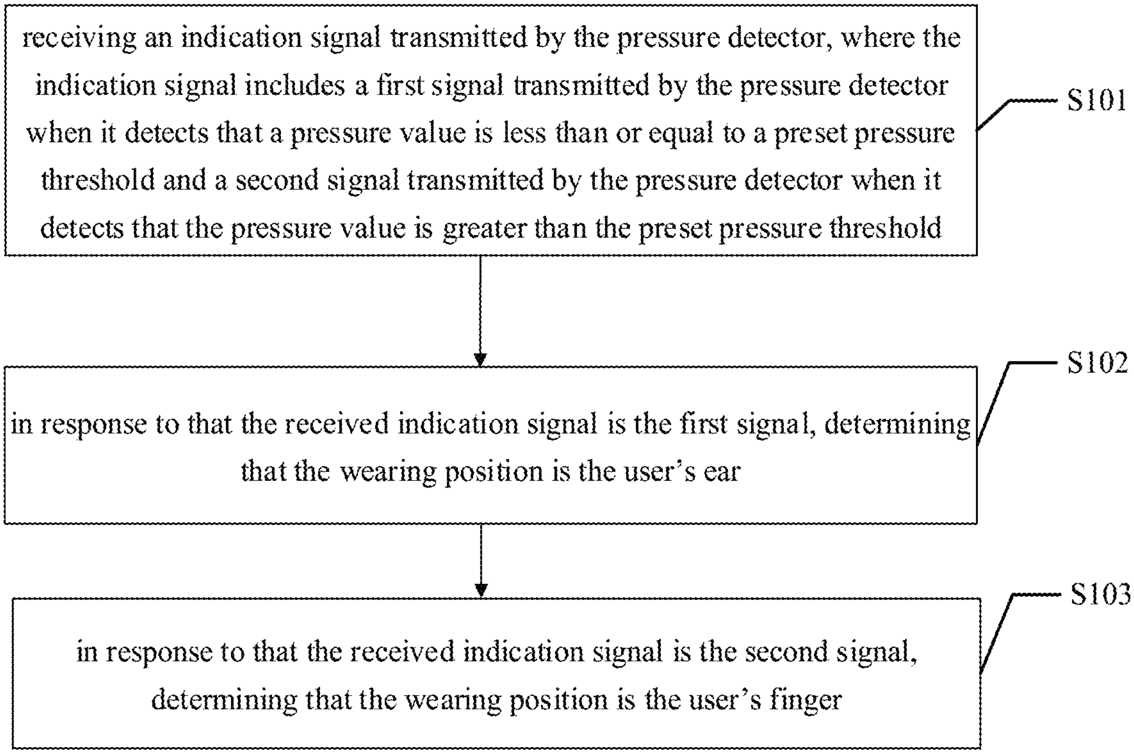
FIG. 5 is a schematic flowchart of an operation control method of a headset according to an embodiment of the present application.

Besides, the pressure detector configured inside the ring headset can be the above-mentioned pressure sensor, and the pressure sensor is configured to detect the pressure value of the ring headset when the user wears the ring headset to distinguish whether the ring headset is currently worn on the user's finger or on the user's ear. In an embodiment, as shown in FIG. 5, the step S10 of determining the wearing position where the user wears the ring headset may include:

Step S101, receiving an indication signal transmitted by the pressure detector, where the indication signal includes a first signal transmitted by the pressure detector when it detects that a pressure value is less than or equal to a preset pressure threshold and a second signal transmitted by the pressure detector when it detects that the pressure value is greater than the preset pressure threshold.

The ring headset receives the indication signal of the pressure detector through an internally configured microprocessor, that is, receives the first signal transmitted by the pressure detector when it detects that the pressure value of the ring headset is less than or equal to the preset pressure threshold, and the second signal transmitted by the pressure detector when it detects that the pressure value is greater than the preset pressure threshold.

It should be noted that, in this embodiment, the preset pressure threshold is a pressure value for the pressure sensor to determine whether to transmit the first signal indicating that the user wears the ring headset on the ear, or to transmit the second signal indicating that the user wears the ring headset on the finger. It should be understood that based on different design requirements of actual applications, the size of the pressure threshold may also be different when the type of pressure sensor configured in the ring headset is different or in other cases. The operation control method of the headset in the present application does not limit the specific size of the pressure threshold.

For example, assuming that the pressure threshold is 1 N, when the user wears the above-mentioned ring headset on the finger or on the ear, since the pressure sensor configured on the ring headset is squeezed by the user's finger or the user's ear, the pressure sensor detects the pressure value given by the user's finger or the user's ear to the ring headset accordingly. Afterwards, when the pressure value is less than or equal to 1 N, the pressure sensor immediately transmits the first signal to the microprocessor of the above-mentioned ring headset so that the ring headset determines that the user is currently wearing the ring headset on the ear based on the first signal, or, when the pressure value is greater than 1 N, the pressure sensor transmits the second signal to the microprocessor so that the ring headset determines that the user is currently wearing the ring headset on the finger based on the second signal.

Step S102, in response to that the received indication signal is the first signal, determining that the wearing position is the user's ear.

After receiving the first signal transmitted by the pressure detector through the microprocessor, the ring headset immediately determines that the user is currently wearing the ring headset on the ear, that is, the current wearing position of the ring headset is the user's ear.

Figure 6:
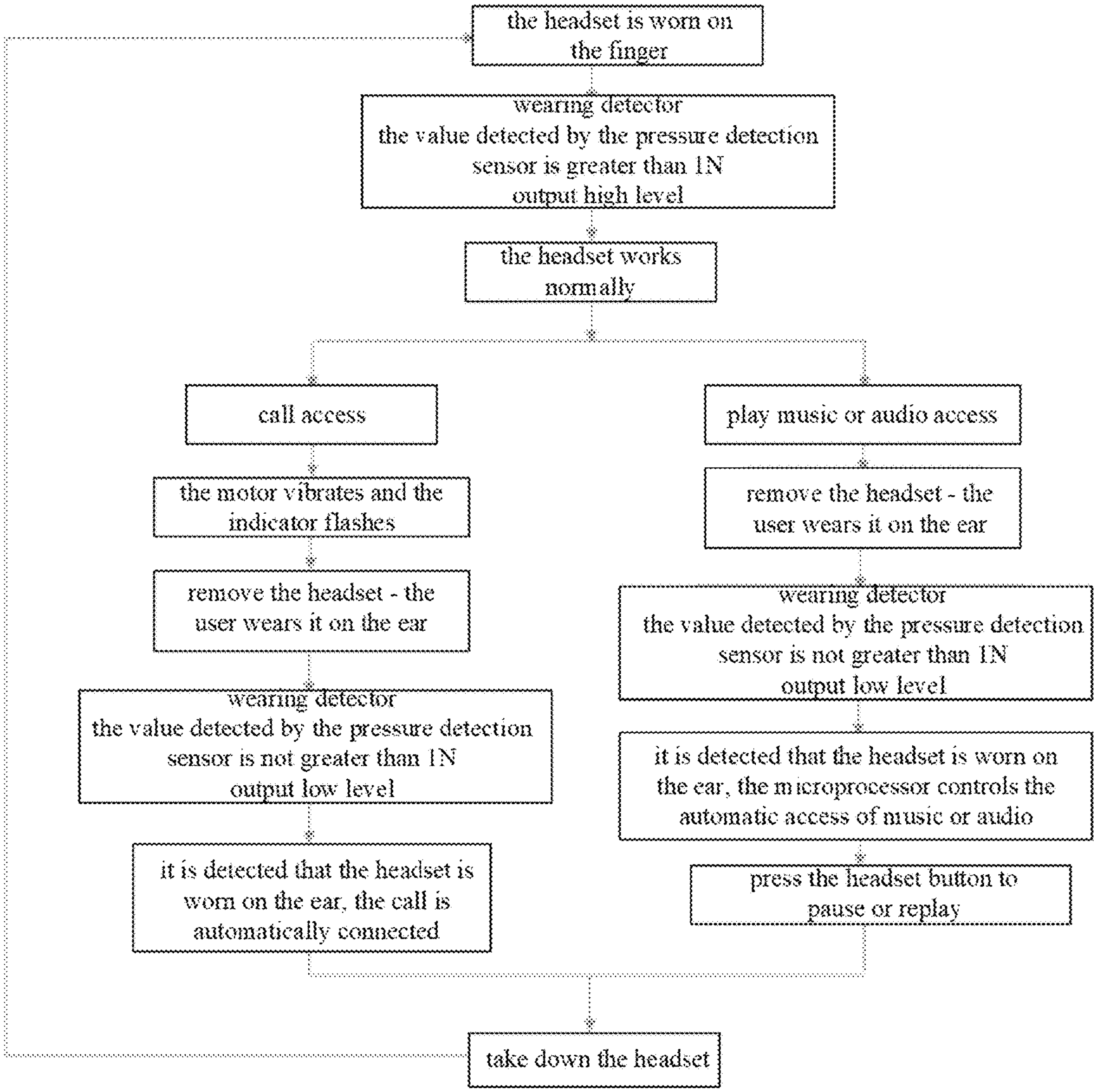
FIG. 6 is a schematic flowchart of an operation control method of a headset according to an embodiment of the present application.

For example, please referring to the application process shown in FIG. 6, it is assumed that the first signal transmitted by the pressure sensor to the microprocessor is a low-level signal. After the user wears the above-mentioned ring headset on the ear and the ring headset determines that the user has worn the headset through the above-mentioned wearing detector, since the pressure sensor (the pressure detection sensor shown in the figure) on the ring headset is squeezed less by the user's ear at this time, the pressure value detected by the pressure sensor is less than or equal to IN, and then the pressure sensor transmits a low-level signal to the microprocessor. After receiving the low-level signal through the microprocessor, the ring headset directly determines that the wearing position where the user wears the ring headset at this time is the user's ear.

Step S103, in response to that the received indication signal is the second signal, determining that the wearing position is the user's finger.

Or, after receiving the second signal transmitted by the pressure detector through the microprocessor, the ring headset immediately determines that the user is currently wearing the ring headset on the finger, that is, the current wearing position of the ring headset is the user's finger.

For example, referring to the application process shown in FIG. 6, it is assumed that the second signal transmitted by the pressure sensor to the microprocessor is a high level signal. After the user wears the above-mentioned ring headset on the finger and the ring headset determines that the user has worn the headset through the above-mentioned wearing detector. Since the pressure sensor on the ring headset is squeezed by the user's finger at this time with relatively large force, the pressure value detected by the pressure sensor is greater than IN, and then the pressure sensor transmits a high-level signal to the microprocessor. After the microprocessor receives the high-level signal, the ring headset directly determines that the wearing position where the user wears the ring headset is the user's finger.

It should be noted that in another embodiment, the pressure detector can also directly transmit the detected pressure value as an indication signal to the microprocessor. Thus, after the microprocessor receives the indication signal, if the pressure value is detected to be less than or equal to the pressure threshold, it is determined that the user is currently wearing the ring headset at the user's ear. Or, if the pressure value is detected to be greater than the pressure threshold, it is determined that the user is currently wearing the ring headset at the user's finger.

Figure 7:
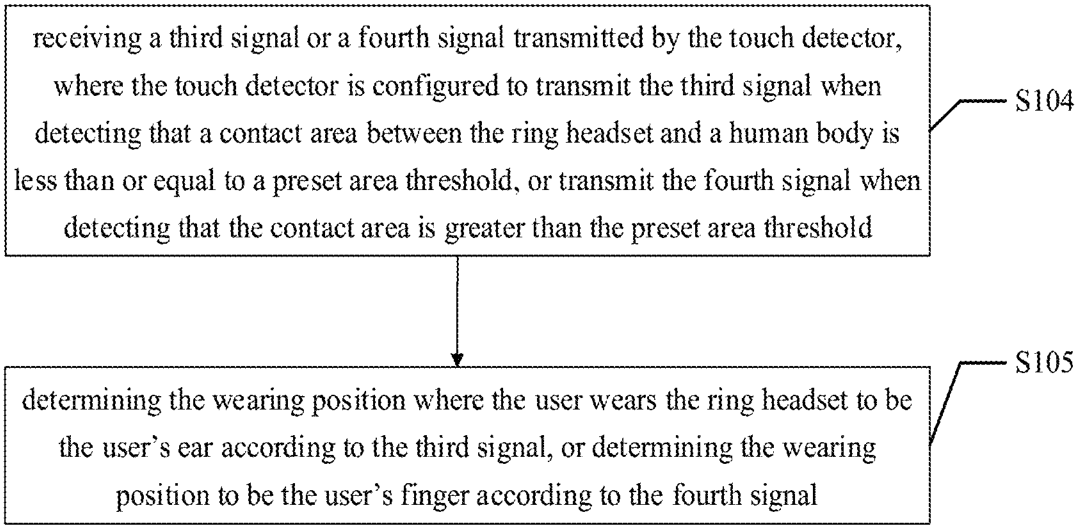
FIG. 7 is a schematic flowchart of an operation control method of a headset according to an embodiment of the present application.

In addition, in another embodiment, in addition to the pressure detector mentioned above, the ring headset may also be internally configured with a touch detector for detecting the contact area between the ring headset and the human body, thereby determining the wearing position through the touch detector. That is, as shown in FIG. 7, the step S10 of determining the wearing position where the user wears the ring headset includes:

Step S104, receiving a third signal or a fourth signal transmitted by the touch detector, where the touch detector is configured to transmit the third signal when detecting that a contact area between the ring headset and a human body is less than or equal to a preset area threshold, or transmit the fourth signal when detecting that the contact area is greater than the preset area threshold.

The ring headset receives the third signal or the fourth signal transmitted by the touch detector though the internally configured microprocessor, that is, receives the third signal transmitted by the touch detector when detecting that the contact area between the ring headset and the human body is less than or equal to the preset area threshold when the touch detector detects that the user wears the ring headset, and receives the fourth signal transmitted by the touch detector when detecting that the contact area is greater than the area threshold.

It should be noted that, in this embodiment, the preset area threshold is the area size for the touch detector to determine whether to transmit the third signal indicating that the user wears the ring headset on the ear or the fourth signal indicating that the user wears the ring headset on the finger. It should be appreciated that based on different design requirements of actual applications, the size of the area threshold can be set to different values accordingly. The operation control method of the headset in the present application does not limit the specific size of the area threshold.

Step S105, determining the wearing position where the user wears the ring headset to be the user's ear according to the third signal, or determining the wearing position to be the user's finger according to the fourth signal.

After receiving the third signal transmitted by the touch detector through the microprocessor, the ring headset immediately determines that the user is currently wearing the ring headset on the ear, that is, the current wearing position of the ring headset is the user's ear. Or, after receiving the fourth signal transmitted by the touch detector through the microprocessor, the ring headset immediately determines that the user is currently wearing the ring headset on the finger, that is, the current wearing position of the ring headset is the user's finger.

It should be noted that in another embodiment, the above-mentioned touch detector can also directly transmit the detected contact area as an indication signal to the microprocessor. In this way, after the ring headset receives the indication signal through the microprocessor, if it is detected that the contact area is less than or equal to the above-mentioned area threshold, it is determined that the user is currently wearing the ring headset on the user's ear. Or, if it is detected that the contact area is greater than the above-mentioned area threshold, it is determined that the user is currently wearing the ring headset on the user's finger.

Figure 8:
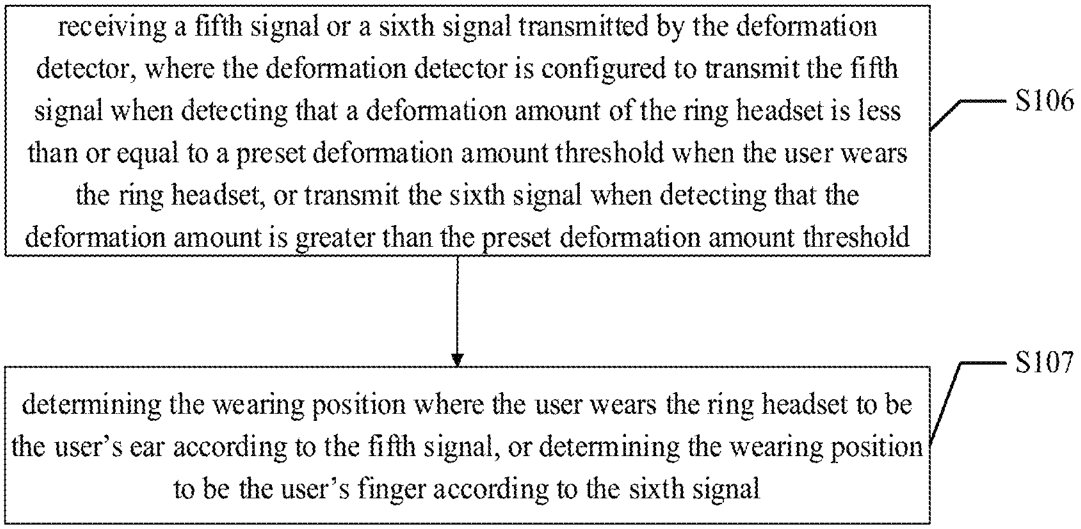
FIG. 8 is a schematic flowchart of an operation control method of a headset according to an embodiment of the present application.

Further, in another embodiment, the ring headset may also be internally configured with a deformation detector for detecting the deformation of the ring headset, so as to determine the wearing position through the deformation detector. That is, as shown in FIG. 8, the step S10 of determining the wearing position where the user wears the ring headset can also include:

Step S106, receiving a fifth signal or a sixth signal transmitted by the deformation detector, where the deformation detector is configured to transmit the fifth signal when detecting that a deformation amount of the ring headset is less than or equal to a preset deformation amount threshold when the user wears the ring headset, or transmit the sixth signal when detecting that the deformation amount is greater than the preset deformation amount threshold.

The ring headset receives the fifth signal or the sixth signal transmitted by the deformation detector through the internally configured microprocessor, that is, receives the fifth signal transmitted by the deformation detector when detecting that the deformation amount generated by the ring headset is less than or equal to the preset deformation amount threshold when the user wears the ring headset, and receives the sixth signal when detecting that the deformation amount generated by the ring headset is greater than the preset deformation amount threshold.

It should be noted that in this embodiment, the preset deformation amount threshold can be set accordingly based on different design requirements of actual applications. The operation control method of the headset in the present application does not limit the specific size of the deformation amount threshold.

Step S107, determining the wearing position where the user wears the ring headset to be the user's ear according to the fifth signal, or determining the wearing position to be the user's finger according to the sixth signal.

Since the user's auricle is softer than the finger, when the user clamps the ring headset on the auricle, the deformation amount generated by the ring headset is relatively small, while when the user clamps the ring headset on the finger, the deformation amount generated by the ring headset is relatively large. After the ring headset receives the fifth signal transmitted by the deformation detector through the microprocessor, it immediately determines that the user is currently wearing the ring headset on the ear, that is, the current wearing position of the ring headset is the user's ear. Or, after the ring headset receives the sixth signal transmitted by the deformation detector through the microprocessor, it immediately determines that the user is currently wearing the ring headset on the finger, that is, the current wearing position of the ring headset is the user's finger.

It should be noted that in another embodiment, the above deformation detector can also directly transmit the detected deformation amount as an indication signal to the microprocessor. In this way, after the ring headset receives the indication signal through the microprocessor, if the deformation amount is detected to be less than or equal to the above deformation amount threshold, it is determined that the user is currently wearing the ring headset at the user's ear, or, if the deformation amount is detected to be greater than the deformation amount threshold, it is determined that the user is currently wearing the ring headset at the user's finger.

Figure 9:
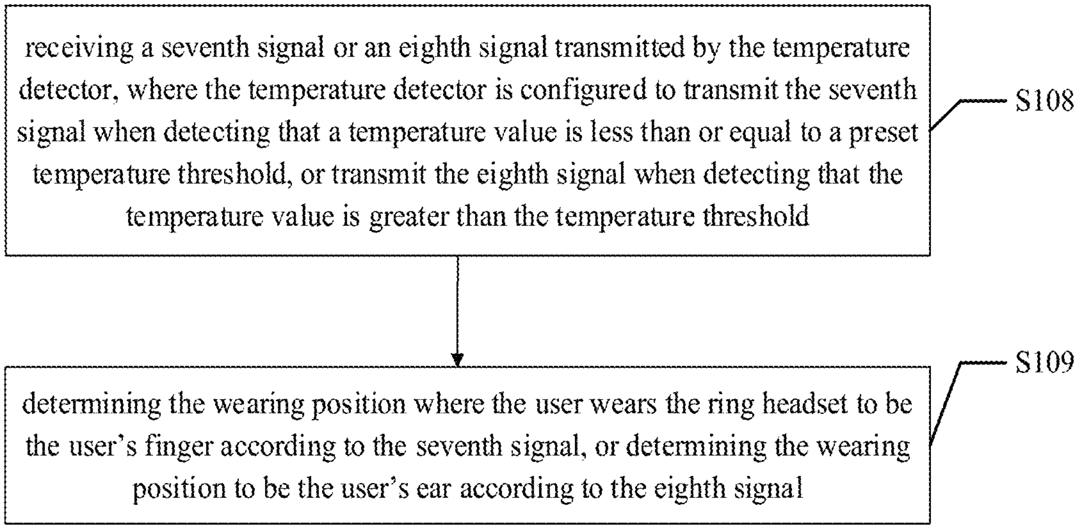
FIG. 9 is a schematic flowchart of an operation control method of a headset according to an embodiment of the present application.

Further, in another embodiment, the ring headset may also be internally configured with a temperature detector for detecting the deformation amount of the ring headset, so as to determine the wearing position through the temperature detector. That is, as shown in FIG. 9, the step S10 of determining the wearing position where the user wears the ring headset may also include:

Step S108, receiving a seventh signal or an eighth signal transmitted by the temperature detector, where the temperature detector is configured to transmit the seventh signal when detecting that a temperature value is less than or equal to a preset temperature threshold, or transmit the eighth signal when detecting that the temperature value is greater than the temperature threshold.

The ring headset receives the seventh signal or the eighth signal transmitted by the temperature detector through the internally configured microprocessor, that is, when the temperature detector detects that the user is wearing the ring headset, the seventh signal is transmitted when the temperature value of the human body contacted by the ring headset is less than or equal to a preset temperature threshold, and the eighth signal is transmitted when the temperature detector detects that the temperature value is greater than the temperature threshold.

It should be noted that in this embodiment, because the surface temperature of the human finger is lower than the surface temperature of the human ear when the temperature of the human body is normal, therefore, the control method of the headset of the present application can use a temperature value between the surface temperature of the human finger and the surface temperature of the human ear as the preset temperature threshold.

Step S109, determining the wearing position where the user wears the ring headset to be the user's finger according to the seventh signal, or determining the wearing position to be the user's ear according to the eighth signal.

After receiving the fifth signal transmitted by the temperature detector through the microprocessor, the ring headset immediately determines that the user is currently wearing the ring headset on the ear, that is, the current wearing position of the ring headset is the user's ear. Or, after receiving the sixth signal transmitted by the temperature detector through the microprocessor, the ring headset immediately determines that the user is currently wearing the ring headset on the finger, that is, the current wearing position of the ring headset is the user's finger.

It should be noted that in another embodiment, the temperature detector can also directly transmit the detected temperature value as an indication signal to the microprocessor. Thus, after the ring headset receives the indication signal through the microprocessor, if the temperature value is detected to be less than or equal to the temperature threshold, it is determined that the user is currently wearing the ring headset at the user's ear, or if the temperature value is detected to be greater than the temperature threshold, it is determined that the user is currently wearing the ring headset at the user's finger.

Step S20, in response to determining that the wearing position is a user's finger, controlling the ring headset to operate a first working mode. The first working mode refers to a normal working mode.

After the ring headset determines the wearing position of the user currently wearing the ring headset, if the ring headset determines that the wearing position is the user's finger, the ring headset controls the ring headset to currently operate the first working mode corresponding to the user's finger through the internally configured microprocessor.

It should be noted that in this embodiment, the first working mode corresponding to the user's finger can be: the ring headset is powered on and in standby mode, or the first working mode can be: while in standby mode, a connection is established with an external mobile terminal through a communication module and the mobile terminal is monitored to determine whether it transmits an audio output instruction.

Further, in an embodiment, the communication module of the ring headset can be the Bluetooth module, or the communication module can also be any other wireless communication module. The operation control method of the headset of the present application is not limited to the specific type of the communication module. The step S20 of controlling the ring headset to operate the first working mode can include:

establishing a communication connection with a preset mobile terminal through the communicator, and monitoring whether the mobile terminal transmits an audio output instruction according to the communication connection to control the ring headset to operate the first working mode.

In this embodiment, the preset mobile terminal can be a user's smart phone, a music player, a wearable device or other mobile terminals. The operation control method of the headset in the present application is not limited to the specific type of the mobile terminal, as long as the mobile terminal can establish a communication connection with the communication module of the ring headset.

In an embodiment, for example, as shown in the application flowchart of FIG. 6, when the ring headset receives the high level signal transmitted by the pressure sensor through the microprocessor, it is determined that the user wears the ring headset on the user's finger, the headset is controlled to perform the normal working. That is, the ring headset establishes a communication connection with the user's smart phone through the Bluetooth module by the internally configured microprocessor. Besides, the microprocessor further monitors the smart phone through the communication connection to see whether a call is connected or the user is controlling the playing of music or audio, and transmits an audio output instruction to the ring headset.

Step S30, in response to determining that the wearing position is a user's ear, controlling the ring headset to operate a second working mode. The second working mode refers to a special working mode.

After the ring headset determines the wearing position of the user currently wearing the ring headset, if the ring headset determines that the wearing position is the user's ear, the ring headset controls the ring headset to currently operate the second working mode corresponding to the user's ear through the internally configured microprocessor.

It should be noted that, in this embodiment, the second working mode corresponding to the user's ear can be a call working mode and an audio playback working mode.

For example, when the ring headset receives the low level signal transmitted by the pressure sensor through the microprocessor, it is determined that the user wears the ring headset on the user's ear, the headset is controlled to operate the second working mode. That is, the ring headset is controlled by the internally configured microprocessor, when a call is received by the smartphone connected to the Bluetooth module of the ring headset, the ring headset receives the real-time call audio transmitted by the smartphone through the above communication connection through the microprocessor, and controls the audio player configured inside the ring headset (the audio player SPK in the above ring headset) to output the real-time call audio, and controls the sound collector of the ring headset (the microphone MIC in the ring headset) to collect real-time voice data and transmit the real-time voice data to the smart phone through a communication connection. Or, the ring headset is controlled by the internally configured microprocessor, when the smartphone connected to the Bluetooth module starts playing music or other audio data and other multimedia audio based on user control, the ring headset is connected to the multimedia audio transmitted by the smart phone through the above communication connection by the microprocessor, and controls the audio player configured inside the ring headset to output the multimedia audio. The microprocessor monitors whether the user triggers the operation instruction of pausing, switching or replaying the multimedia audio by pressing the button of the ring headset, and responds when the operation instruction is detected.

In this embodiment, the ring headset detects whether the user is wearing the ring headset through the internally configured wearing detector. Then, when it is detected that the user is wearing the ring headset, the internally configured pressure detector is further used to determine the current wearing position of the user wearing the ring headset. Afterwards, if the ring headset determines that the wearing position is the user's finger, the ring headset controls the ring headset through the internally configured microprocessor to currently operate the first working mode corresponding to the user's finger; or, if the ring headset determines that the wearing position is the user's ear, the ring headset controls the ring headset through the internally configured microprocessor to currently operate the second working mode corresponding to the user's ear.

Compared with traditional TWS headsets, when the user does not carry the headset box or loses the corresponding headset box, the TWS headsets are not carried or even lost, the present application enables the user to directly wear the ring headset on the finger or on the ear, and the ring headset controls the headset to operate in different working modes based on the user wearing the ring headset on the finger or on the ear. As such, the present application not only avoids the dependence of the TWS headsets on the headset box when carrying it, but also improves the convenience of the user to carry the headsets and makes it less likely to cause the headsets to be lost, can also automatically control the corresponding working mode of the ring headset according to the position where the user wears the ring headset, which greatly improves the intelligence of controlling the operation of the headset and improves the user's experience of using the headset.

Figure 10:
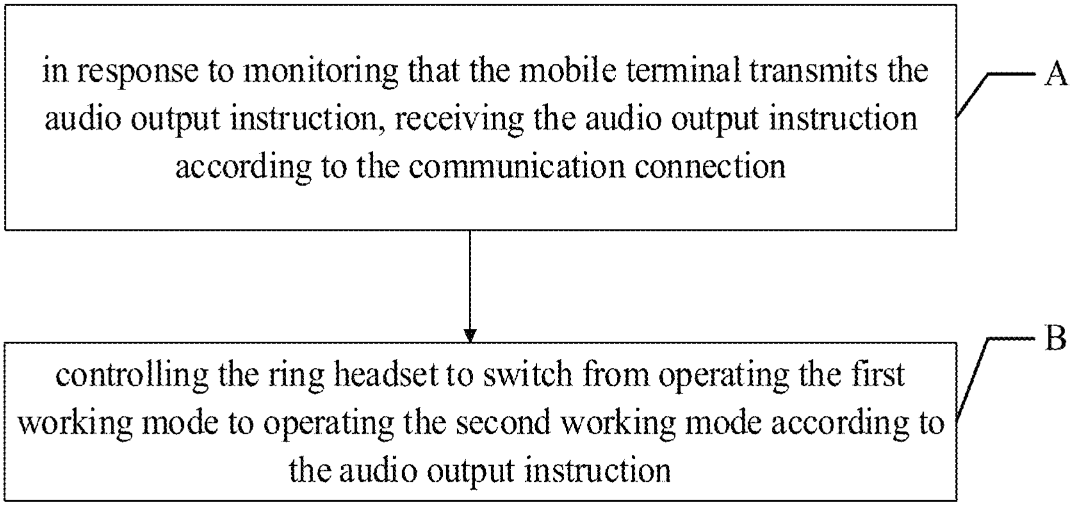
FIG. 10 is a schematic flowchart of an operation control method of a headset according to an embodiment of the present application.

Further, based on the above embodiments, another embodiment of the present application provides an operation control method of a headset. In this embodiment, as shown in FIG. 10, after the step S201 of monitoring whether the mobile terminal transmits the audio output instruction according to the communication connection, the operation control method of the headset in the present application can further include:

Step A, in response to monitoring that the mobile terminal transmits the audio output instruction, receiving the audio output instruction according to the communication connection.

After the ring headset establishes a communication connection with the mobile terminal through the above-mentioned communication module, if the ring headset monitors that the mobile terminal transmits an audio output instruction to the ring headset through the communication connection, the ring headset receives the audio output instruction based on the communication connection.

For example, the microprocessor of the ring headset establishes a communication connection with the user's smart phone through the above-mentioned Bluetooth module. When it is detected that the smart phone has a call incoming, the user controls the playing of music or audio, the audio output instruction is transmitted to the ring headset, and the audio output instruction is immediately received based on the communication connection.

Step B, controlling the ring headset to switch from operating the first working mode to operating the second working mode according to the audio output instruction.

According to the audio output instruction transmitted by the mobile terminal, the ring headset is controlled to switch the currently running first working mode to the second working mode corresponding to the audio output instruction.

Further, in an embodiment, the audio output instruction can be: the mobile terminal transmits a call audio output instruction to the ring headset when a call is connected, and the mobile terminal transmits a multimedia audio output instruction to the ring headset when the user controls the playing of multimedia audio such as music or other audio.

Figure 11:
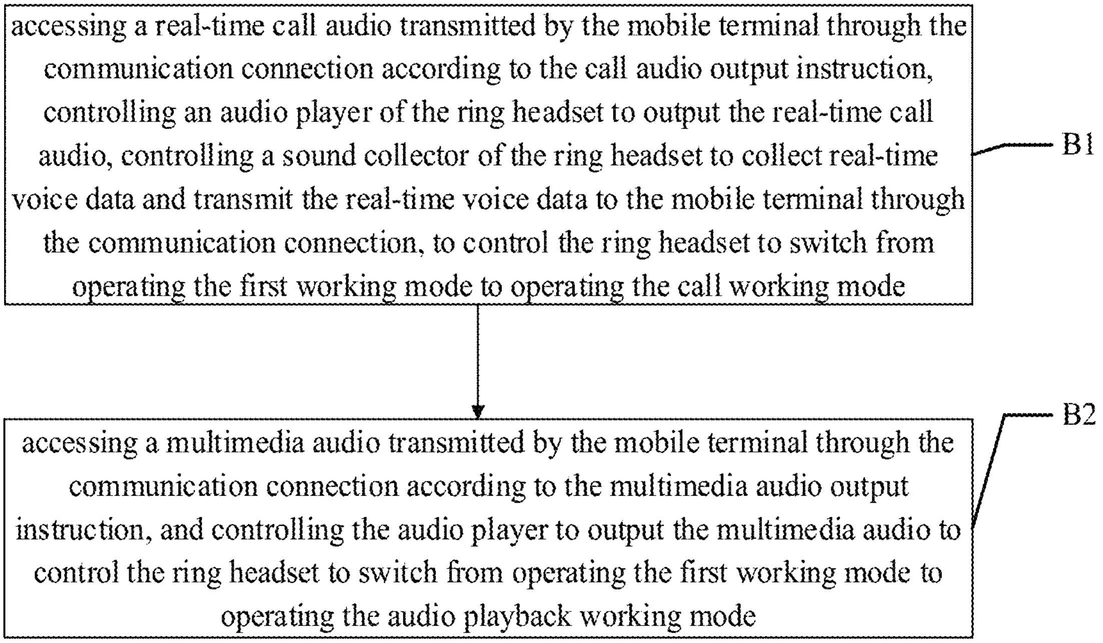
FIG. 11 is a schematic flowchart of an operation control method of a headset according to an embodiment of the present application.

As shown in FIG. 11, the step B can include:

Step B1, accessing a real-time call audio transmitted by the mobile terminal through the communication connection according to the call audio output instruction, controlling an audio player of the ring headset to output the real-time call audio, controlling a sound collector of the ring headset to collect real-time voice data and transmit the real-time voice data to the mobile terminal through the communication connection, to control the ring headset to switch from operating the first working mode to operating the call working mode.

After receiving the call audio output instruction transmitted by the mobile terminal through the above communication connection, the ring headset is immediately controlled to switch the currently running first working mode to the call working mode in the second working mode corresponding to the call audio output instruction. That is, the ring headset is controlled to currently operate the above-mentioned call working mode, thereby accessing the real-time call audio transmitted by the mobile terminal through the communication connection, and the audio player of the ring headset is controlled to output the real-time call audio, the sound collector of the ring headset is controlled to collect the real-time voice data and the real-time voice data is transmitted to the mobile terminal through the communication connection.

In an embodiment, for example, when the ring headset detects that the smart phone has a call incoming through the communication connection established between the Bluetooth module and the smart phone, the call audio output instruction is transmitted to the ring headset through the communication connection. After receiving the audio output instruction based on the communication connection, the ring headset is accessed to the real-time call audio transmitted by the smart phone through the above communication connection by the microprocessor, and the audio player configured inside the ring headset (the audio player SPK in the above ring headset) is controlled to output the real-time call audio, and the sound collector of the ring headset (the microphone MIC in the above ring headset) is controlled to collect real-time voice data and transmit the real-time voice data to the smart phone through the communication connection, so as to switch the ring headset from operating in the above first working mode to operating in the call working mode in the second working mode.

Step B2, accessing a multimedia audio transmitted by the mobile terminal through the communication connection according to the multimedia audio output instruction, and controlling the audio player to output the multimedia audio to control the ring headset to switch from operating the first working mode to operating the audio playback working mode.

After receiving the multimedia audio output instruction transmitted by the mobile terminal through the above communication connection, the ring headset is immediately controlled to switch the currently running first working mode to the audio playback working mode in the second working mode corresponding to the multimedia audio output instruction, that is, the ring headset is controlled to operate the above audio playback working mode, so as to access the multimedia audio transmitted by the mobile terminal through the communication connection, and the audio player of the ring headset is controlled to output the multimedia audio.

In an embodiment, for example, the ring headset detects that the user is controlling the smartphone to play music through the communication connection established between the Bluetooth module and the smartphone, the multimedia audio output instruction is transmitted to the ring headset through the communication connection. After receiving the multimedia audio output instruction based on the communication connection, the ring headset is controlled by the internally configured microprocessor to access the multimedia audio transmitted by the smartphone through the above communication connection—the music data played by the user controlling the smartphone, and control the audio player configured inside the ring headset—the audio player SPK to output the multimedia audio. The microprocessor monitors whether the user triggers an operation instruction such as pausing playback, switching playback or replaying the multimedia audio output based on pressing a button of the ring headset, and responds when the operation instruction is detected, thereby switching the ring headset from operating the first working mode to the audio playback working mode in the second working mode.

In this embodiment, after the ring headset receives the call audio output instruction transmitted by the mobile terminal through the above communication connection, the ring headset is immediately controlled to switch the currently running first working mode to the call working mode in the second working mode corresponding to the call audio output instruction. That is, the ring headset is controlled to currently operate the above-mentioned call working mode, so as to access the real-time call audio transmitted by the mobile terminal through the communication connection, and the audio player of the ring headset is controlled to output the real-time call audio, and the sound collector of the ring headset is controlled to collect real-time voice data and the real-time voice data is transmitted to the mobile terminal through the communication connection. Or, the ring headset is controlled to switch the currently running first working mode to the audio playback working mode in the second working mode corresponding to the multimedia audio output instruction, that is, the ring headset is controlled to operate the above audio playback working mode, so as to access the multimedia audio transmitted by the mobile terminal through the communication connection, and the audio player of the ring headset is controlled to output the multimedia audio.

In this way, the ring headset can automatically respond to switch the working mode according to the connection between the ring headset and the mobile terminal when a call is connected to the mobile terminal or the mobile terminal is controlled by the user to play music, thereby further improving the intelligence of controlling the operation of the headset.

Figure 12:
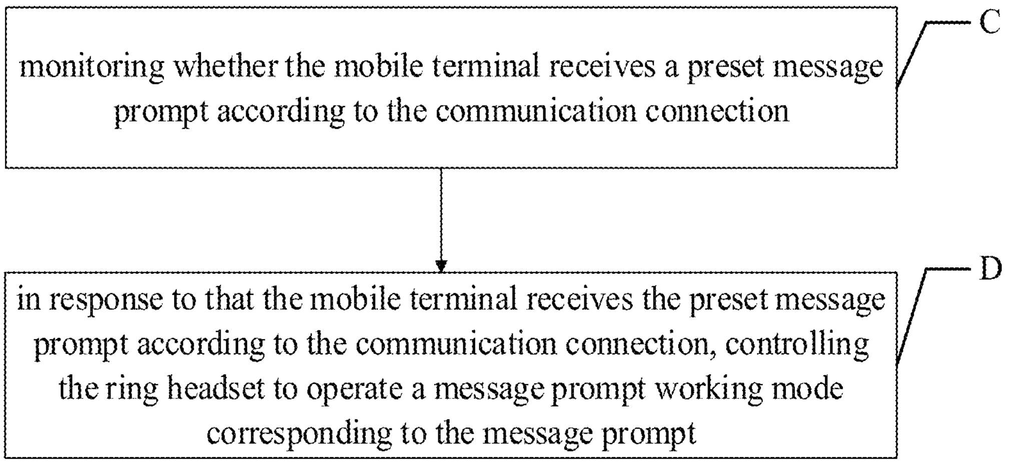
FIG. 12 is a schematic flowchart of an operation control method of a headset according to an embodiment of the present application.

Further, based on the above embodiments, another embodiment of the present application provides an operation control method of a headset. In this embodiment, as shown in FIG. 12, after the step S201 of establishing the communication connection with the preset mobile terminal through the communicator, the operation control method of the headset of the present application can further include:

Step C, monitoring whether the mobile terminal receives a preset message prompt according to the communication connection.

In this embodiment, in addition to monitoring the audio output instruction transmitted by the mobile terminal through the above-mentioned communication connection, the ring headset further monitors whether the mobile terminal receives a preset message prompt through the communication connection.

It should be noted that in this embodiment, the preset message prompt can be: a prompt output to the user by the mobile terminal connected to the communicator in the ring headset when receiving a message such as a text message and an application notification.

Step D, in response to that the mobile terminal receives the preset message prompt according to the communication connection, controlling the ring headset to operate a message prompt working mode corresponding to the message prompt.

It should be noted that in this embodiment, the message prompt working mode may be: the ring headset controls the internally configured vibrator and/or display to operate to prompt the user that the mobile terminal currently receives a message.

Further, in an embodiment, the step D of controlling the ring headset to operate the message prompt working mode corresponding to the message prompt can include:

vibrating through the vibrator and/or outputting display information corresponding to the message prompt through the display to control the ring headset to operate the message prompt working mode, where the display information includes lighting information and text information corresponding to the message prompt.

When the ring headset is controlled to operate the message prompt working mode, the microprocessor can control only the vibrator to vibrate, or control the display to output the display information corresponding to the message prompt received by the mobile terminal while controlling the vibrator to vibrate, that is, output the lighting information corresponding to the message prompt and the text information corresponding to the message prompt, or alternatively, only the display is controlled to output the display information corresponding to the message prompt received by the mobile terminal.

It should be noted that in this embodiment, the vibrator configured inside the above-mentioned ring headset may be the above-mentioned motor vibrator, and the display configured inside the above-mentioned ring headset may be the above-mentioned indicator light and screen.

For example, the microprocessor of the ring headset establishes a communication connection with the user's smartphone through the Bluetooth module, and detects that the smartphone currently receives a text message, the ring headset is controlled by the microprocessor to run the message prompt working mode to control the motor vibrator to vibrate. Alternatively, the microprocessor controls the motor vibrator to vibrate while controlling the indicator light to output the light information of the corresponding color when the smartphone receives a text message and controls the screen to output the text information of the text message. Alternatively, the microprocessor only controls the indicator light to output the light information and/or controls the screen to output the text information of the text message.

Further, in an embodiment, when the ring headset monitors and receives the call audio output instruction in the audio output instruction through the above communication connection, it can also control the ring headset to run the above message prompt working mode to control the vibrator to vibrate and/or control the display to output light information, and after monitoring that the user triggers an instruction to connect to a call while the ring headset is running the message prompt working mode, the ring headset is controlled to switch to the above-mentioned call working mode.

In this embodiment, in addition to monitoring the audio output instruction transmitted by the mobile terminal through the above communication connection, the ring headset further monitors whether the mobile terminal receives a preset message prompt through the communication connection, and immediately controls the ring headset to run the message prompt working mode corresponding to the current situation when the mobile terminal receives the preset message prompt through the above communication connection.

As such, the ring headset automatically responds to the state change of the connected mobile terminal (such as receiving a text message, a message or an incoming call) and controls the corresponding message prompt working mode to remind the user to pay attention to the state change of the mobile terminal in time, thereby further improving the intelligence of controlling the operation of the headset and improving the user experience of the headset.

Figure 13:
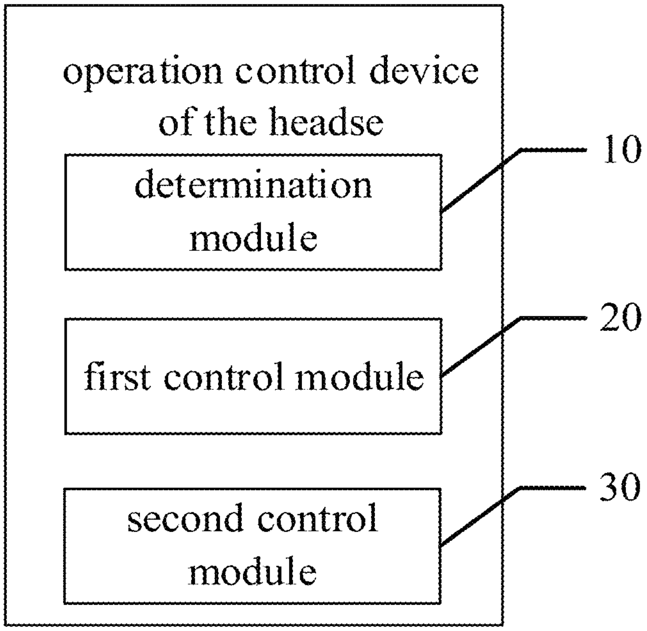
FIG. 13 is a schematic diagram of functional modules of an operation control device of a headset according to an embodiment of the present application.

In addition, the embodiments of the present application further provide an operation control device of a headset, and the device is deployed in the ring headset involved in each of the above embodiments. As shown in FIG. 13, the operation control device of the headset in the present application includes a determination module 10, a first control module 20, and a second control module 30.

The determination module 10 is configure for determining a wearing position where the user wears the ring headset in response to detecting that a user is wearing the ring headset.

The first control module 20 is configured for controlling the ring headset to operate a first working mode in response to determining that the wearing position is a user's finger.

The second control module 30 is configured for controlling the ring headset to operate a second working mode in response to determining that the wearing position is a user's car.

In an embodiment, the ring headset includes a pressure detector, and the determination module 10 includes a receiving unit, a first determination unit and a second determination unit.

The receiving unit is configured for receiving an indication signal transmitted by the pressure detector, where the indication signal includes a first signal transmitted by the pressure detector when it detects that a pressure value is less than or equal to a preset pressure threshold and a second signal transmitted by the pressure detector when it detects that the pressure value is greater than the preset pressure threshold.

The first determination unit is configured for determining that the wearing position is the user's ear in response to that the received indication signal is the first signal.

The second determination unit is configured for determining that the wearing position is the user's finger in response to that the received indication signal is the second signal.

In an embodiment, the ring headset further includes a communicator, and the first control module 20 is configured for establishing a communication connection with a preset mobile terminal through the communicator, and monitoring whether the mobile terminal transmits an audio output instruction according to the communication connection to control the ring headset to operate the first working mode.

In an embodiment, the operation control device of the headset in the present application further includes a receiving module and a third control module.

The receiving module is configured for receiving the audio output instruction according to the communication connection in response to monitoring that the mobile terminal transmits the audio output instruction.

The third control module is configured for controlling the ring headset to switch from operating the first working mode to operating the second working mode according to the audio output instruction.

In an embodiment, the audio output instruction includes a call audio output instruction and a multimedia audio output instruction, and the second working mode includes a call working mode and an audio playback working mode. The third control module includes a first switch control unit and a second switch control unit.

The first switch control unit is configured for accessing a real-time call audio transmitted by the mobile terminal through the communication connection according to the call audio output instruction, controlling an audio player of the ring headset to output the real-time call audio, controlling a sound collector of the ring headset to collect real-time voice data and transmit the real-time voice data to the mobile terminal through the communication connection, to control the ring headset to switch from operating the first working mode to operating the call working mode.

The second switch control unit is configured for accessing a multimedia audio transmitted by the mobile terminal through the communication connection according to the multimedia audio output instruction, and controlling the audio player to output the multimedia audio to control the ring headset to switch from operating the first working mode to operating the audio playback working mode.

In an embodiment, the operation control device of the headset in the present application further includes a monitoring module and a fourth control module.

The monitoring module is configured for monitoring whether the mobile terminal receives a preset message prompt according to the communication connection.

The fourth control module is configured for controlling the ring headset to operate a message prompt working mode corresponding to the message prompt in response to that the mobile terminal receives the preset message prompt according to the communication connection.

In an embodiment, the ring headset further includes a vibrator and a display, and the fourth control module is configured for vibrating through the vibrator and/or outputting display information corresponding to the message prompt through the display to control the ring headset to operate the message prompt working mode, where the display information includes lighting information and text information corresponding to the message prompt.

The expanded contents of the specific implementation methods of the operation control device of the headset of the present application are basically the same as the embodiments of the operation control method of the headset mentioned above, and will not be repeated here.

Besides, the embodiments of the present application further provide a ring headset. The ring headset of the present application includes a structural shell, a communication module, a main control module (such as a microcontroller unit MCU), a speaker, a microphone, a memory, or the like. The main control module may include a microprocessor, an audio decoding unit, a power supply and a power management unit, sensors and other active or passive devices required by the system (which may be replaced, deleted or added according to actual functions) to realize the reception and playback functions of wireless audio.

The ring headset of the present application can establish a communication connection with the user's mobile terminal through the communication module. The memory of the ring headset can store the operation control program of the headset, and the operation control program of the headset can be called by the microprocessor in the ring headset and perform the following operations:

- in response to detecting that a user is wearing the ring headset, determining a wearing position where the user wears the ring headset;
- in response to determining that the wearing position is a user's finger, controlling the ring headset to operate a first working mode; or
- in response to determining that the wearing position is a user's ear, controlling the ring headset to operate a second working mode.

In an embodiment, the ring headset includes a pressure detector, and the determining the wearing position where the user wears the ring headset includes:

- receiving an indication signal transmitted by the pressure detector, where the indication signal includes a first signal transmitted by the pressure detector when it detects that a pressure value is less than or equal to a preset pressure threshold and a second signal transmitted by the pressure detector when it detects that the pressure value is greater than the preset pressure threshold;
- in response to that the received indication signal is the first signal, determining that the wearing position is the user's ear; or
- in response to that the received indication signal is the second signal, determining that the wearing position is the user's finger.

In an embodiment, the ring headset further includes a communicator, and the controlling the ring headset to operate the first working mode includes:

- establishing a communication connection with a preset mobile terminal through the communicator, and monitoring whether the mobile terminal transmits an audio output instruction according to the communication connection to control the ring headset to operate the first working mode.

In an embodiment, after monitoring whether the mobile terminal transmits the audio output instruction according to the communication connection, the method further includes:

in response to monitoring that the mobile terminal transmits the audio output instruction, receiving the audio output instruction according to the communication connection; and controlling the ring headset to switch from operating the first working mode to operating the second working mode according to the audio output instruction.

In an embodiment, the audio output instruction includes a call audio output instruction and a multimedia audio output instruction, and the second working mode includes a call working mode and an audio playback working mode;

the controlling the ring headset to switch from operating the first working mode to operating the second working mode according to the audio output instruction includes:

accessing a real-time call audio transmitted by the mobile terminal through the communication connection according to the call audio output instruction, controlling an audio player of the ring headset to output the real-time call audio, controlling a sound collector of the ring headset to collect real-time voice data and transmit the real-time voice data to the mobile terminal through the communication connection, to control the ring headset to switch from operating the first working mode to operating the call working mode; or accessing a multimedia audio transmitted by the mobile terminal through the communication connection according to the multimedia audio output instruction, and controlling the audio player to output the multimedia audio to control the ring headset to switch from operating the first working mode to operating the audio playback working mode.

In an embodiment, after establishing the communication connection with the preset mobile terminal through the communicator, the method further includes:

monitoring whether the mobile terminal receives a preset message prompt according to the communication connection; and in response to that the mobile terminal receives the preset message prompt according to the communication connection, controlling the ring headset to operate a message prompt working mode corresponding to the message prompt.

In an embodiment, the ring headset further includes a vibrator and a display, and the controlling the ring headset to operate the message prompt working mode corresponding to the message prompt includes:

vibrating through the vibrator and/or outputting display information corresponding to the message prompt through the display to control the ring headset to operate the message prompt working mode, where the display information includes lighting information and text information corresponding to the message prompt.

Besides, the present application further provides a computer-readable storage medium. The computer-readable storage medium stores the operation control program of the headset. When the operation control program of the headset is executed by the processor, the steps of the operation control method of the headset of the present application as described above are implemented.

The various embodiments of the ring headset and the computer-readable storage medium of the present application can refer to the various embodiments of the operation control method of the headset of the present application, which will not be repeated here.

It should be noted that in this document, the terms "comprise", "include" or any other variants thereof are intended to cover a non-exclusive inclusion. Thus, a process, method, article, or device that includes a series of elements not only includes those elements, but also includes other elements that are not explicitly listed, or also includes elements inherent to the process, method, article, or device. If there are no more restrictions, the element defined by the sentence "including a . . . " does not exclude the existence of other identical elements in the process, method, article or device that includes the element.

The serial numbers of the foregoing embodiments of the present application are only for description, and do not represent the advantages and disadvantages of the embodiments.

Through the description of the above embodiment, those skilled in the art can clearly understand that the above-mentioned embodiments can be implemented by software plus a necessary general hardware platform, of course, it can also be implemented by hardware, but in many cases the former is a better implementation. Based on this understanding, the technical solution of the present application can be embodied in the form of software product in essence or the part that contributes to the existing technology. The computer software product is stored on a storage medium (such as ROM/RAM, magnetic disk, optical disk) as described above, including several instructions to cause a terminal device (which can be a mobile phone, a computer, a server, an air conditioner, or a network device, etc.) to execute the method described in each embodiment of the present application.

The above are only some embodiments of the present application, and do not limit the scope of the present application thereto. Under the concept of the present application, equivalent structural transformations made according to the description and drawings of the present application, or direct/indirect application in other related technical fields are included in the scope of the present application.

What is claimed is:

1. An operation control method of a headset, applied to a ring headset, comprising:

in response to detecting that a user is wearing the ring headset, determining a wearing position where the user wears the ring headset;

in response to determining that the wearing position is a user's finger, controlling the ring headset to operate a first working mode; or in response to determining that the wearing position is a user's ear, controlling the ring headset to operate a second working mode, wherein the ring headset comprises a deformation detector, and the determining the wearing position where the user wears the ring headset comprises:

receiving a fifth signal or a sixth signal transmitted by the deformation detector, wherein the deformation detector is configured to transmit the fifth signal when detecting that a deformation amount of the ring headset is less than or equal to a preset deformation amount threshold when the user wears the ring headset, or transmit the sixth signal when detecting that the deformation amount is greater than the preset deformation amount threshold; and determining the wearing position where the user wears the ring headset to be the user's ear according to the fifth signal, or determining the wearing position to be the user's finger according to the sixth signal.

2. The operation control method of the headset according to claim 1, wherein the ring headset comprises a pressure detector, and the determining the wearing position where the user wears the ring headset comprises:

receiving an indication signal transmitted by the pressure detector, wherein the indication signal comprises a first signal transmitted by the pressure detector when it detects that a pressure value is less than or equal to a preset pressure threshold and a second signal transmitted by the pressure detector when it detects that the pressure value is greater than the preset pressure threshold;

in response to that the received indication signal is the first signal, determining that the wearing position is the user's ear; or in response to that the received indication signal is the second signal, determining that the wearing position is the user's finger.

3. The operation control method of the headset according to claim 1, wherein the ring headset comprises a touch detector, and the determining the wearing position where the user wears the ring headset comprises:

receiving a third signal or a fourth signal transmitted by the touch detector, wherein the touch detector is configured to transmit the third signal when detecting that a contact area between the ring headset and a human body is less than or equal to a preset area threshold, or transmit the fourth signal when detecting that the contact area is greater than the preset area threshold; and determining the wearing position where the user wears the ring headset to be the user's ear according to the third signal, or determining the wearing position to be the user's finger according to the fourth signal.

4. The operation control method of the headset according to claim 1, wherein the ring headset comprises a temperature detector, and the determining the wearing position where the user wears the ring headset comprises:

receiving a seventh signal or an eighth signal transmitted by the temperature detector, wherein the temperature detector is configured to transmit the seventh signal when detecting that a temperature value is less than or equal to a preset temperature threshold, or transmit the eighth signal when detecting that the temperature value is greater than the temperature threshold; and determining the wearing position where the user wears the ring headset to be the user's finger according to the seventh signal, or determining the wearing position to be the user's ear according to the eighth signal.

5. The operation control method of the headset according to claim 1, wherein the ring headset further comprises a communicator, and the controlling the ring headset to operate the first working mode comprises:

establishing a communication connection with a preset mobile terminal through the communicator, and monitoring whether the mobile terminal transmits an audio output instruction according to the communication connection to control the ring headset to operate the first working mode.

6. The operation control method of the headset according to claim 5, wherein after monitoring whether the mobile terminal transmits the audio output instruction according to the communication connection, the method further comprises:

in response to monitoring that the mobile terminal transmits the audio output instruction, receiving the audio output instruction according to the communication connection; and controlling the ring headset to switch from operating the first working mode to operating the second working mode according to the audio output instruction.

7. The operation control method of the headset according to claim 6, wherein the audio output instruction comprises a call audio output instruction and a multimedia audio output instruction, and the second working mode comprises a call working mode and an audio playback working mode;

the controlling the ring headset to switch from operating the first working mode to operating the second working mode according to the audio output instruction comprises:

accessing a real-time call audio transmitted by the mobile terminal through the communication connection according to the call audio output instruction, controlling an audio player of the ring headset to output the real-time call audio, controlling a sound collector of the ring headset to collect real-time voice data and transmit the real-time voice data to the mobile terminal through the communication connection, to control the ring headset to switch from operating the first working mode to operating the call working mode; or accessing a multimedia audio transmitted by the mobile terminal through the communication connection according to the multimedia audio output instruction, and controlling the audio player to output the multimedia audio to control the ring headset to switch from operating the first working mode to operating the audio playback working mode.

8. The operation control method of the headset according to claim 5, wherein after establishing the communication connection with the preset mobile terminal through the communicator, the method further comprises:

monitoring whether the mobile terminal receives a preset message prompt according to the communication connection; and in response to that the mobile terminal receives the preset message prompt according to the communication connection, controlling the ring headset to operate a message prompt working mode corresponding to the message prompt.

9. The operation control method of the headset according to claim 8, wherein the ring headset further comprises a vibrator and a display, and the controlling the ring headset to operate the message prompt working mode corresponding to the message prompt comprises:

vibrating through the vibrator and/or outputting display information corresponding to the message prompt through the display to control the ring headset to operate the message prompt working mode, wherein the display information comprises lighting information and text information corresponding to the message prompt.

10. A ring headset, comprising:

a memory;

a processor; and an operation control program of a headset stored in the memory and executable on the processor, wherein when the control program of the headset is executed by the processor, the operation control method of the headset according to claim 1 is implemented.

11. A non-transitory computer-readable storage medium, wherein an operation control program of a headset is stored in the non-transitory computer-readable storage medium, and when the control program of the headset is executed by a processor, the operation control method of the headset according to claim 1 is implemented.

* * * * *